(12) United States Patent
Noriega (10) Patent No.: US 10,918,027 B1
(45) Date of Patent: Feb. 16, 2021

(54) CLIMBING PALM TREE TRIMMER (71) Applicant: Santiago E. Noriega, Chino, CA (US)

(72) Inventor: Santiago E. Noriega, Chino, CA (US)

(*) Notice: Subject to any disclaimer, the term of this patent is extended or adjusted under 35 U.S.C. 154(b) by 134 days.

(21) Appl. No.: 16/357,471

(22) Filed: Mar. 19, 2019

(51) Int. Cl.
A01G 23/095 (2006.01)
A01G 3/08 (2006.01)

(52) U.S. Cl.
CPC .......... A01G 23/0955 (2013.01); A01G 3/085 (2013.01)

(58) Field of Classification Search
CPC .... A01G 23/0955; A01G 23/095; A01G 3/08; A01G 3/085
See application file for complete search history.

(56) References Cited

U.S. PATENT DOCUMENTS

| 3,482,392 | A | * | 12/1969 | Ooki | G04B 19/247 368/233 |
| 5,983,966 | A | | 11/1999 | Clouston | |
| 6,474,377 | B1 | | 11/2002 | Mortel | |
| 6,672,346 | B1 | | 1/2004 | Heckmaier | |
| 7,422,041 | B2 | | 9/2008 | Smith | |
| 7,997,311 | B2 | | 8/2011 | Prout, Jr. | |
| 8,307,865 | B1 | | 11/2012 | Cuffel | |
| 8,517,066 | B1 | * | 8/2013 | Van De Mortel | B27L 1/06 144/24.13 |
| 2007/0181217 | A1 | | 8/2007 | Ahdoot | |
| 2009/0277536 | A1 | | 11/2009 | Scott | |
| 2011/0265912 | A1 | | 11/2011 | Arvidsson | |

FOREIGN PATENT DOCUMENTS

WO 2006069223 6/2006

* cited by examiner

Primary Examiner — Matthew Katcoff (57) ABSTRACT

The climbing palm tree trimmer may ascend and descend a tree trunk of a palm tree in order to trim the top of the palm tree. A cutting ring may rotate within a housing ring so that a plurality of blades projecting upwards from the cutting ring may cut trimmings from the palm tree. The cutting ring may separate such that the cutting ring may be placed around the tree trunk and reassembled. The housing ring may likewise separate such that the housing ring may be placed around the tree trunk and reassembled. A plurality of drive units may move the climbing palm tree trimmer up or down the tree trunk. Up and down movements and activation of the cutting ring may be controlled from the ground using the trimmer control box.

15 Claims, 8 Drawing Sheets

FIG. 8

CLIMBING PALM TREE TRIMMER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of grounds maintenance equipment, more specifically, a climbing palm tree trimmer.

SUMMARY OF INVENTION

The climbing palm tree trimmer may ascend and descend a tree trunk of a palm tree in order to trim the top of the palm tree. A cutting ring may rotate within a housing ring so that a plurality of blades projecting upwards from the cutting ring may cut trimmings from the palm tree. The cutting ring may separate such that the cutting ring may be placed around the tree trunk and reassembled. The housing ring may likewise separate such that the housing ring may be placed around the tree trunk and reassembled. A plurality of drive units may move the climbing palm tree trimmer up or down the tree trunk. Up and down movements and activation of the cutting ring may be controlled from the ground using the trimmer control box.

An object of the invention is to trim the top of a palm tree using a cutting ring that comprises a plurality of vertically oriented blades and that is free to rotate within a housing ring.

Another object of the invention is to provide a plurality of drive units that move the trimmer up and down the tree trunk.

A further object of the invention is to separate the cutting ring and the housing ring so that they may be placed around the trunk of the tree.

Yet another object of the invention is to control the cutting motor and the plurality of drive motors from the ground.

Another object of the invention is to use an electric motor, a gas motor, hydraulics, or pneumatics to run the claimed device.

These together with additional objects, features and advantages of the climbing palm tree trimmer will be readily apparent to those of ordinary skill in the art upon reading the following detailed description of the presently preferred, but nonetheless illustrative, embodiments when taken in conjunction with the accompanying drawings.

In this respect, before explaining the current embodiments of the climbing palm tree trimmer in detail, it is to be understood that the climbing palm tree trimmer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the climbing palm tree trimmer.

It is therefore important that the claims be regarded as including such equivalent construction insofar as they do not depart from the spirit and scope of the climbing palm tree trimmer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
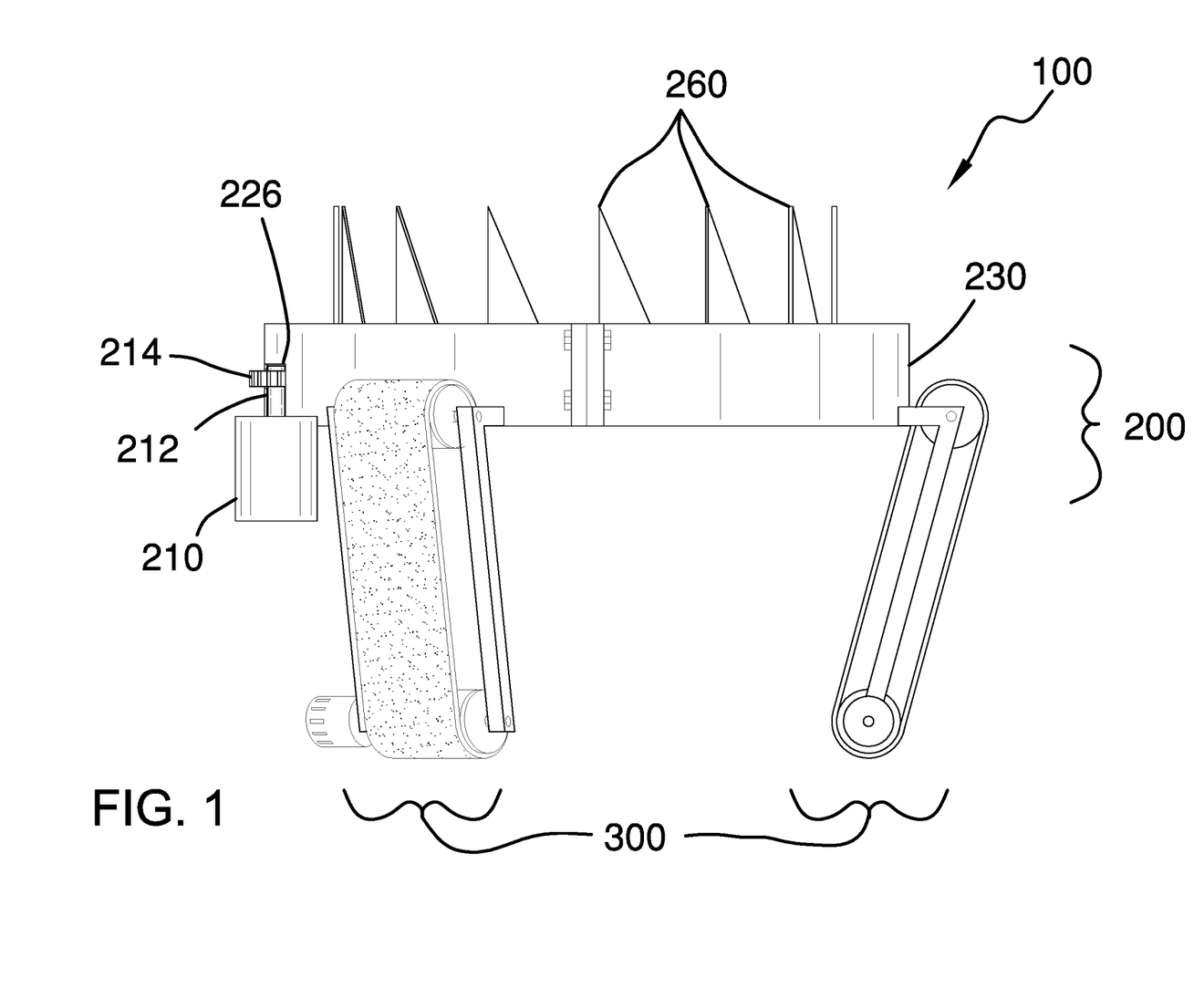
FIG. 1 is a front view of an embodiment of the disclosure.
Figure 2:
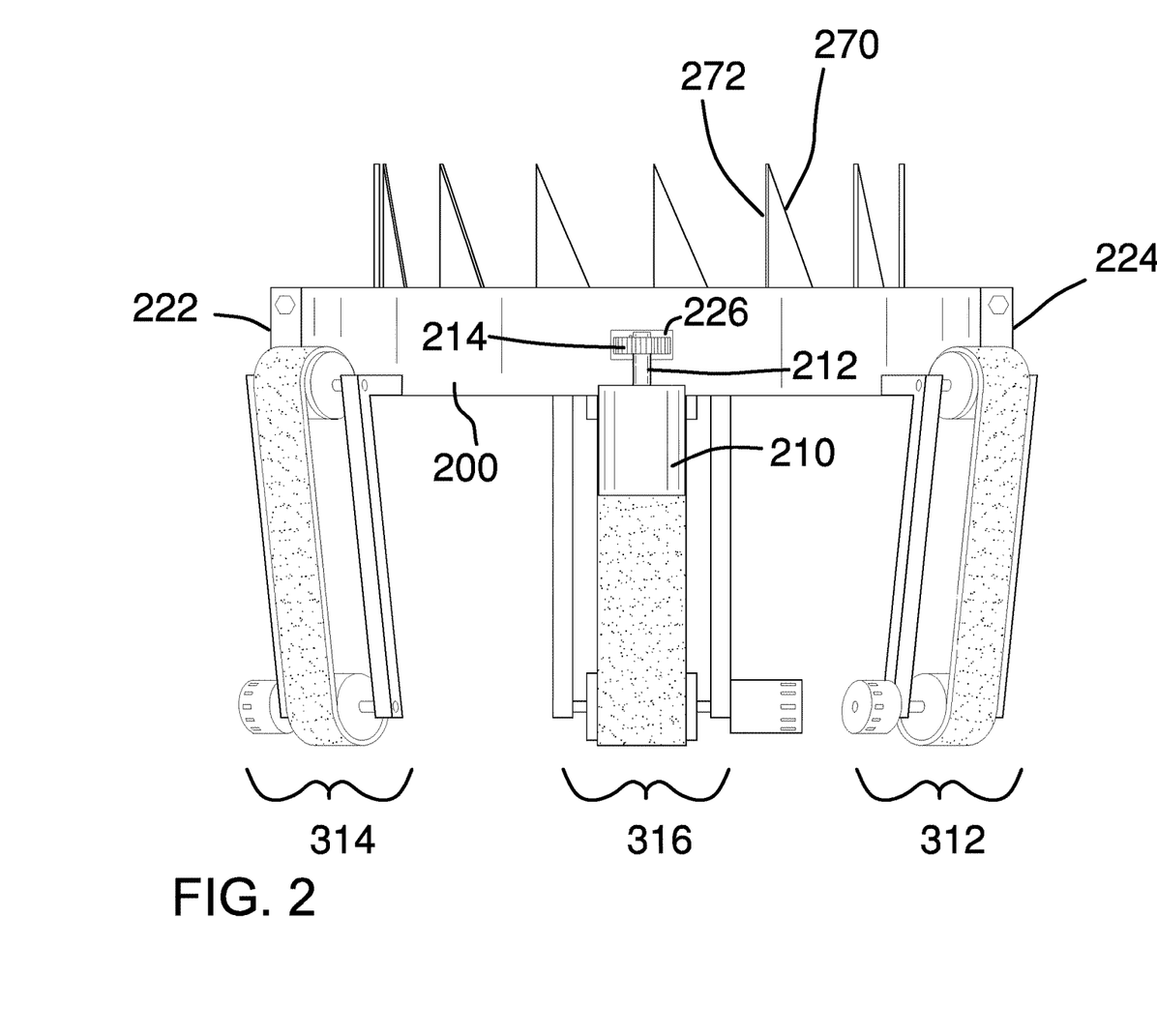
FIG. 2 is a left side view of an embodiment of the disclosure.
Figure 3:
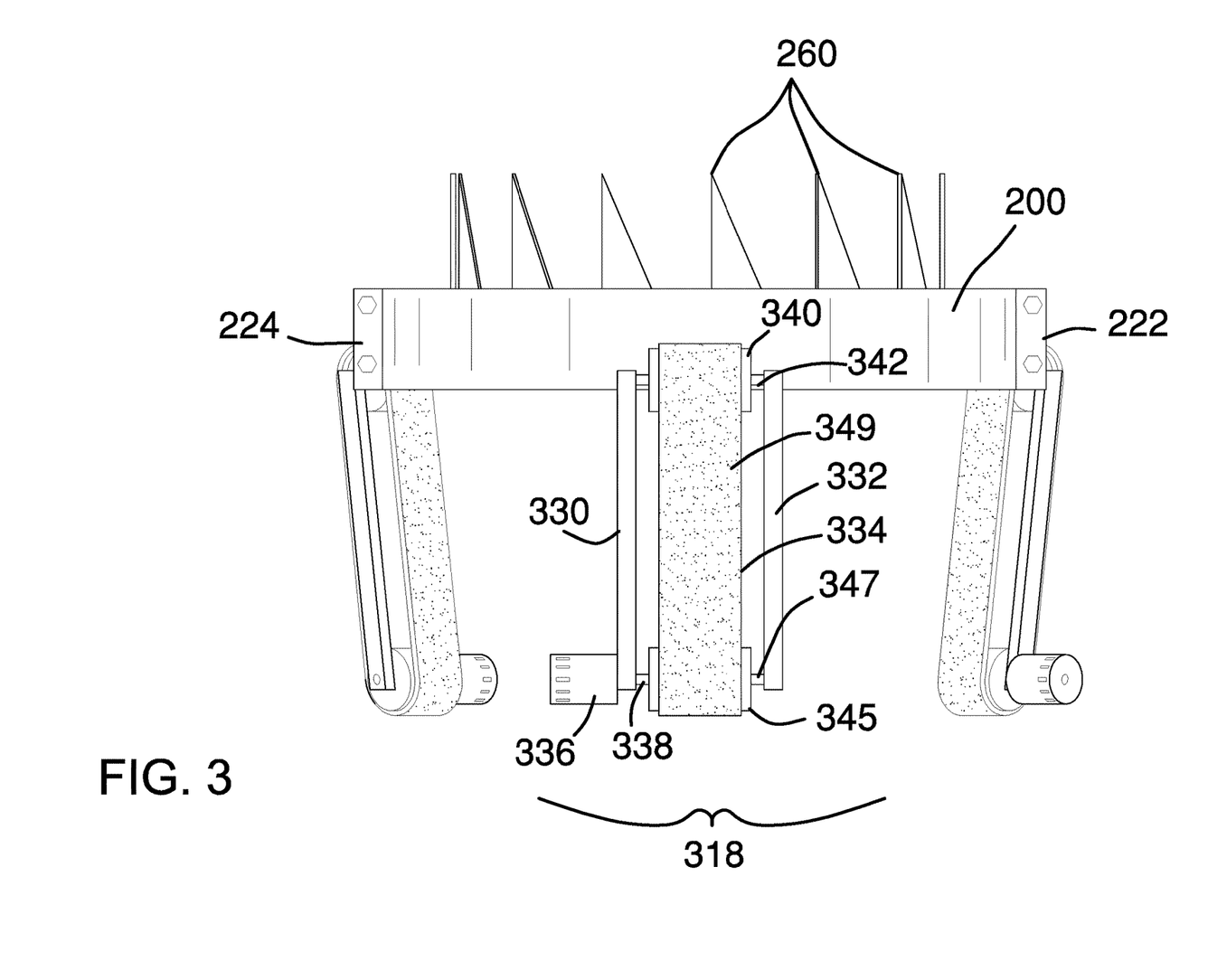
FIG. 3 is a right side view of an embodiment of the disclosure.
Figure 4:
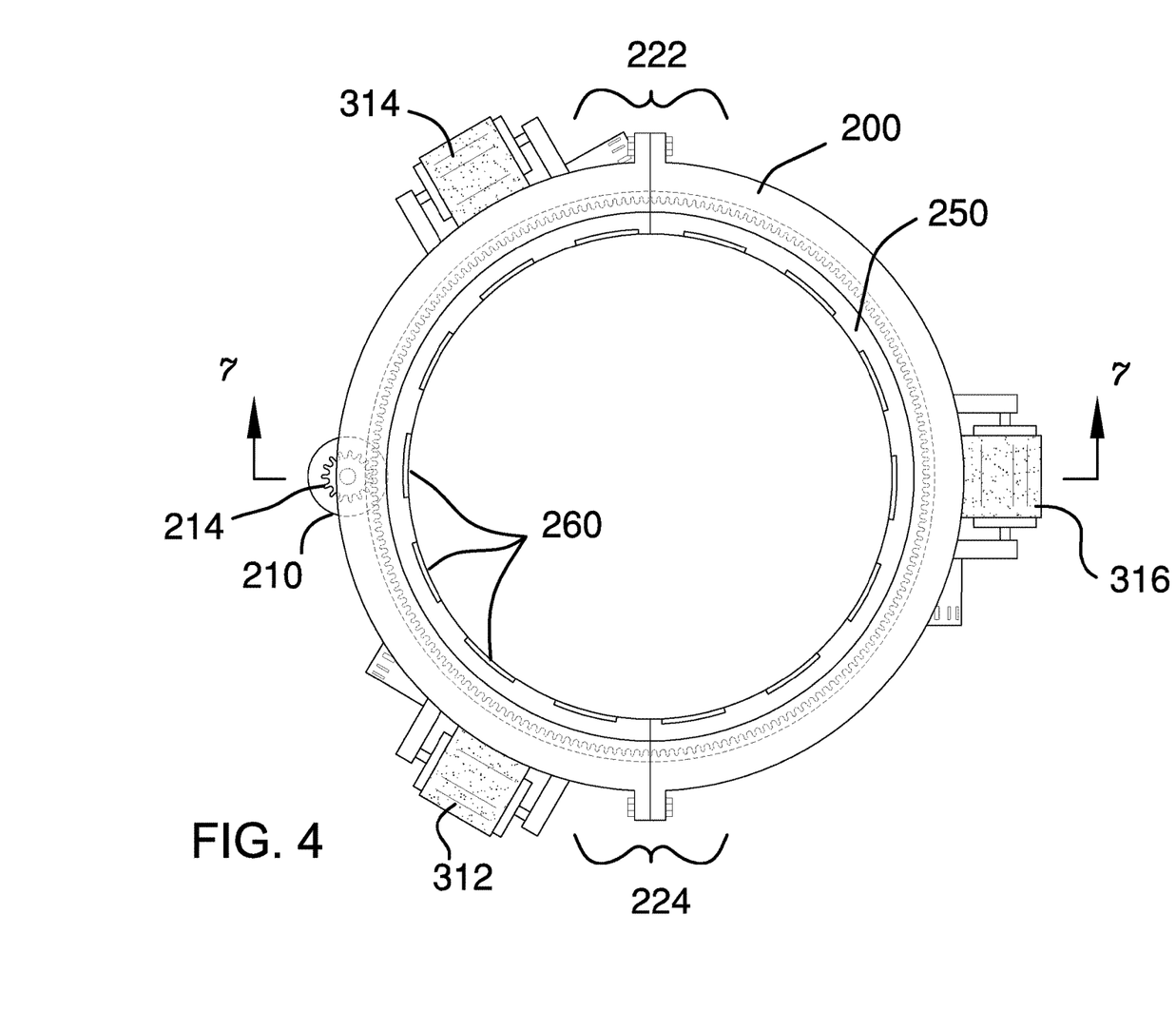
FIG. 4 is a top view of an embodiment of the disclosure.
Figure 5:
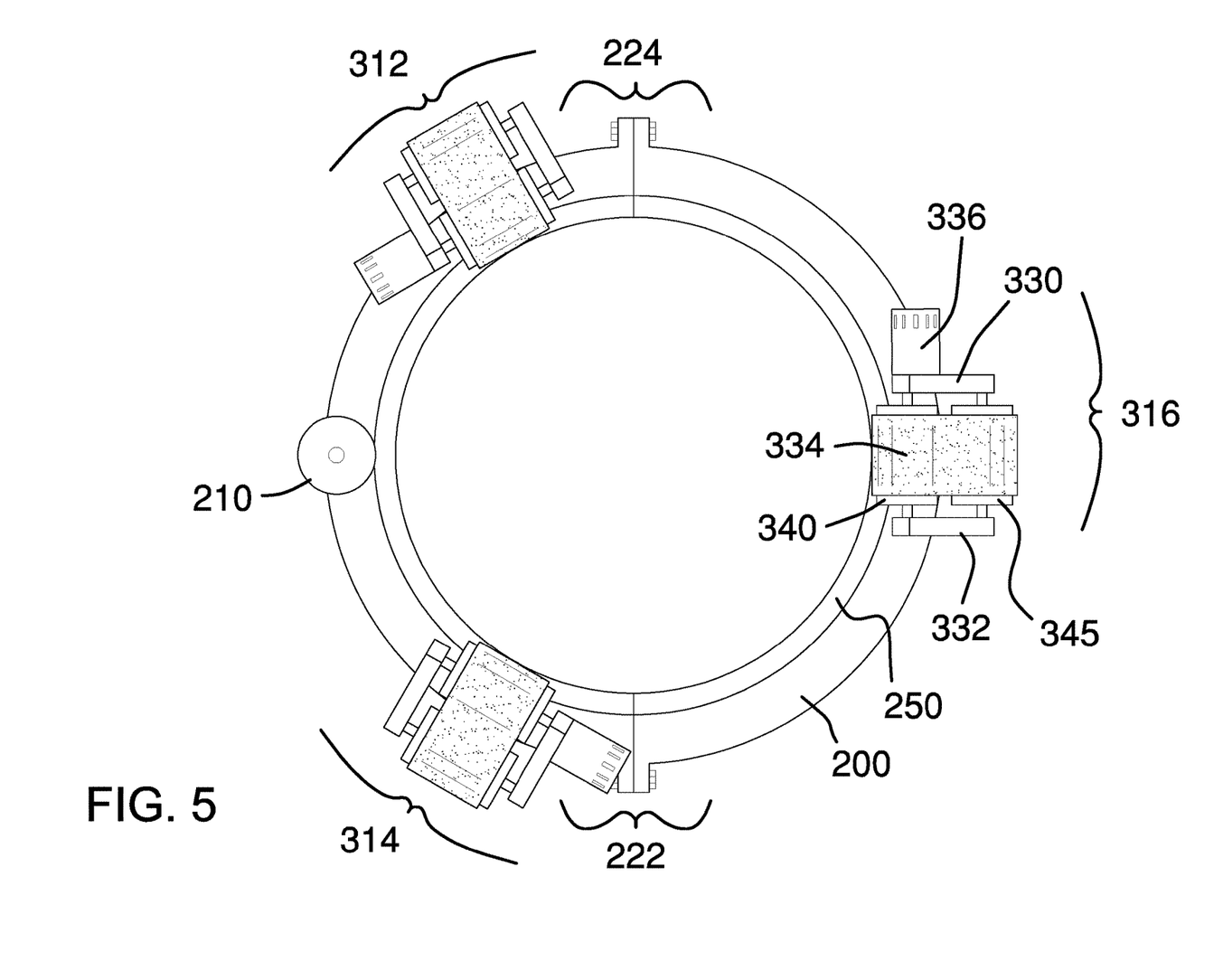
FIG. 5 is a bottom view of an embodiment of the disclosure.
Figure 6:
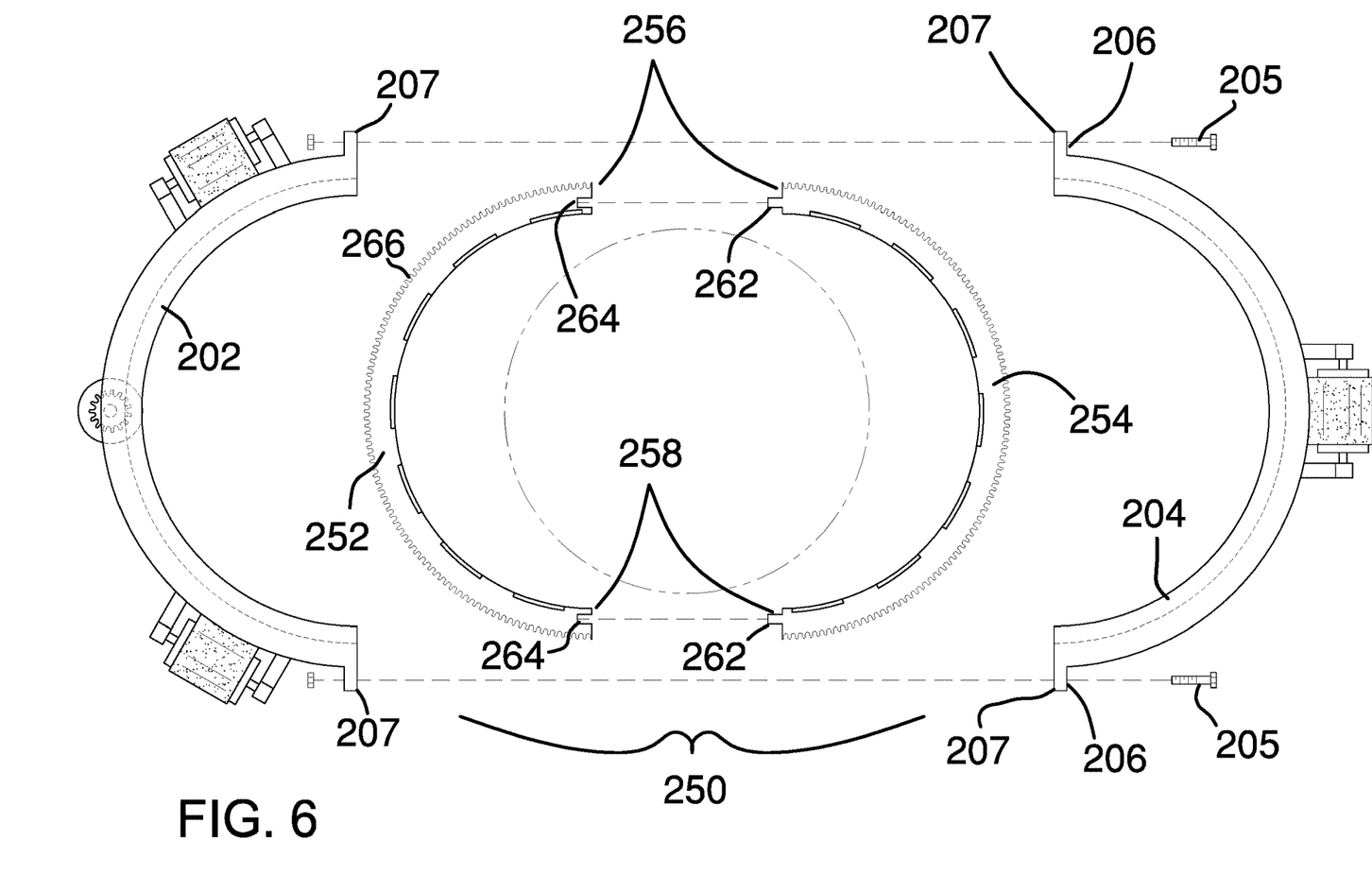
FIG. 6 is an exploded detail view of an embodiment of the disclosure.
Figure 7:
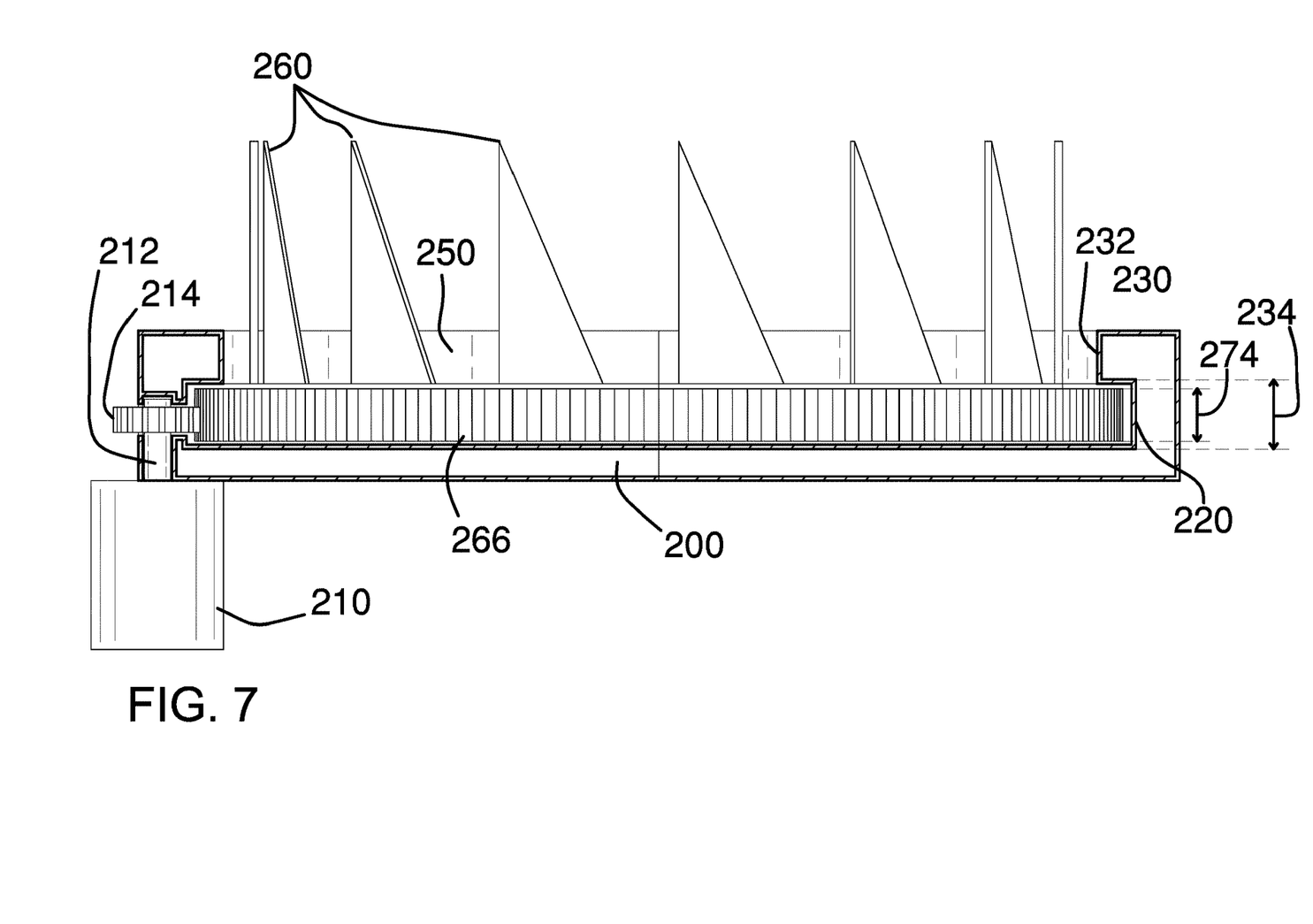
FIG. 7 is a cross-sectional view of an embodiment of the disclosure across 7-7 as shown in FIG. 4.
Figure 8:
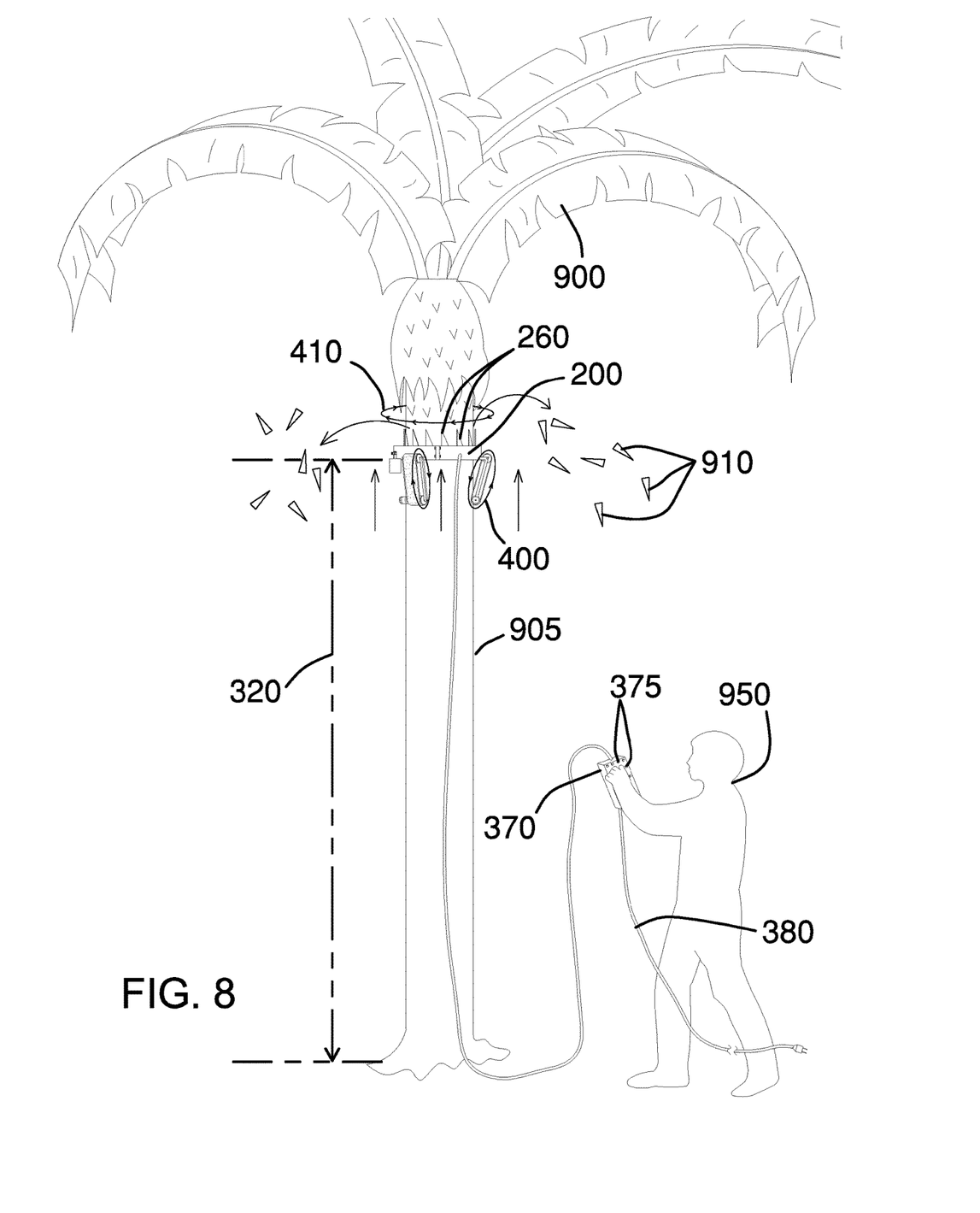
FIG. 8 is an in-use view of an embodiment of the disclosure.

Detailed reference will now be made to a first potential embodiment of the disclosure, which is illustrated in FIGS. 1 through 8.

The climbing palm tree trimmer 100 (hereinafter invention) comprises a housing ring 200, a cutting ring 250, a plurality of drive units 300, a trimmer control box 370, and a power cord 380. The invention 100 may ascend and descend a tree trunk 905 of a palm tree 900 in order to trim the top of the palm tree 900. The cutting ring 250 may rotate within the housing ring 200 so that a plurality of blades 260 projecting upwards from the cutting ring 250 may cut trimmings 910. The cutting ring 250 may separate such that the cutting ring 250 may be placed around the tree trunk 905 and reassembled. The housing ring 200 may likewise separate such that the housing ring 200 may be placed around the tree trunk 905 and reassembled. The plurality of drive units 300 may move the invention 100 up or down the tree trunk 905. Up and down movements and activation of the cutting ring 250 may be controlled from the ground using the trimmer control box 370.

The housing ring 200 may comprise a first housing ring half 202, a second housing ring half 204, a cutting motor 210, a blade track 220, a first housing ring joint 222, and a second housing ring joint 224. The housing ring 200 may be an annular frame of the invention 100. The housing ring 200 may surround the tree trunk 905 of the palm tree 900 in a horizontal orientation. The plurality of drive units 300 may be coupled to an outer wall 230 of the housing ring 200 equally spaced around the outer wall 230. The cutting ring 250 may rotate within the housing ring 200. The cutting motor 210 may be coupled to the housing ring 200 such that a pinion gear 214 on the cutting motor 210 may mesh with a ring gear 266 on the cutting ring 250 via a gear aperture 226 on the housing ring 200.

The housing ring 200 may separate into the first housing ring half 202 and the second housing ring half 204 such that the housing ring 200 may be placed around the tree trunk 905 of the palm tree 900. The first housing ring half 202 may separate from the second housing ring half 204 at the first housing ring joint 222 and the second housing ring joint 224. As non-limiting examples, the first housing ring joint 222 and the second housing ring joint 224 may each comprise a plurality of screws 205 passing through screw apertures 206 in flanges 207 of the first housing ring joint 222 and the second housing ring joint 224.

The first housing ring half 202 and the second housing ring half 204 may each comprise one half of the housing ring 200. The first housing ring half 202 may comprise a first drive unit 312, a second drive unit 314 and the cutting motor 210. The second housing ring half 204 may comprise a third drive unit 316.

The cutting motor 210 may be coupled to the first housing ring half 202 with a first shaft 212 of the cutting motor 210 vertically oriented and the pinion gear 214 mounted to the top end of the first shaft 212 above the cutting motor 210. The cutting motor 210 may be positioned such that the pinion gear 214 aligns with the gear aperture 226 in the housing ring 200. The cutting motor 210 may convert electrical energy into mechanical energy. The cutting motor 210 may cause rotation of the pinion gear 214 when electrical energy is applied to the cutting motor 210. The electrical energy applied to the cutting motor 210 may be controlled by the trimmer control box 370 via the power cord 380. The pinion gear 214 may mesh with the ring gear 266 of the cutting ring 250 such that rotation of the pinion gear 214 when the cutting motor 210 is energized causes the cutting ring 250 to rotate. The cutting motor 210 may rotate in a direction that causes a leading edge 272 of an individual blade 270 selected from the plurality of blades 260 to strike the palm tree 900 before any other portion of the individual blade 270.

It shall be noted that the cutting motor 210 may be an electric motor, a gas or diesel engine, hydraulically-powered, or pneumatically-powered.

The blade track 220 may be a groove around an inner wall 232 of the housing ring 200. A track height 234 of the blade track 220 may be larger than a cutting ring height 274 of the cutting ring 250 such that the cutting ring 250 fits within the blade track 220. The circumference of the blade track 220 may be larger than the circumference of the cutting ring 250 such that the cutting ring 250 is free to rotate while confined by the blade track 220.

The cutting ring 250 may comprise a first cutting ring half 252, a second cutting ring half 254, the plurality of blades 260, and the ring gear 266. The cutting ring 250 may be an annular armature that carries the plurality of blades 260. The circumference of the cutting ring 250 may be larger than the circumference of the inner wall 232 of the housing ring 200 such that the housing ring 200 retains the cutting ring 250 within the blade track 220 on the housing ring 200.

The cutting ring 250 may separate into the first cutting ring half 252 and the second cutting ring half 254 by cleaving at a first cutting ring joint 256 and at a second cutting ring joint 258. The first cutting ring joint 256 and the second cutting ring joint 258 may be kept in alignment by a tab 262 and a slot 264 located at both the first cutting ring joint 256 and the second cutting ring joint 258. Separation of the first cutting ring half 252 from the first cutting ring half 252 may be prevented by the blade track 220 of the housing ring 200 which squeezes the first cutting ring half 252 and the second cutting ring half 254 together.

The invention 100 may be assembled by placing the first cutting ring half 252 and the second cutting ring half 254 on opposites sides of the tree trunk 905 and aligning the tab 262 and the slot 264 at the first cutting ring half 252 and the tab 262 and the slot 264 at the first cutting ring half 252 such that the cutting ring 250 surrounds the tree trunk 905. The first housing ring half 202 and the second housing ring half 204 may then be placed over the first cutting ring half 252 and the second cutting ring half 254 such that the first cutting ring half 252 and the second cutting ring half 254 slip into the blade track 220 on the first housing ring half 202 and on the second housing ring half 204. The plurality of screws 205 may be passed through the screw apertures 206 on the flanges 207 at the first housing ring joint 222 and the second housing ring joint 224 to hold the housing ring 200 together.

The plurality of blades 260 may project upwards from the top surface of the cutting ring 250. The plurality of blades 260 may be adjacent to the inside edge of the cutting ring 250 such that the plurality of blades 260 project upwards without interference from the housing ring 200. The ring gear 266 may comprise a plurality of teeth located along the outside edge of the cutting ring 250. The size, shape, and spacing of the teeth may be complementary to the size, shape, and spacing of teeth on the pinion gear 214 such that the pinion gear 214 and the ring gear 266 may mesh.

The plurality of drive units 300 may comprise the first drive unit 312, the second drive unit 314, and the third drive unit 316. The plurality of drive units 300 may contact the tree trunk 905 of the palm tree 900 and may hold the housing ring 200 at a vertical height 320. The plurality of drive units 300 may be energized by electricity having a first polarity to increase the vertical height 320 of the housing ring 200. The plurality of drive units 300 may be energized by electricity having a second polarity to decrease the vertical height 320 of the housing ring 200.

An individual drive unit 318 selected from the first drive unit 312, the second drive unit 314, and the second drive unit 314 may comprise a first drive frame member 330, a second drive frame member 332, a drive motor 336, a top roller 340, a bottom roller 345, and a drive belt 334. The first drive frame member 330 and the second drive frame member 332 may be located on opposite sides of the individual drive unit 318. The top of the first drive frame member 330 and the top of the second drive frame member 332 may be coupled to the outer wall 230 of the housing ring 200. The first drive frame member 330 and the second drive frame member 332 may each extend horizontally away from the housing ring 200 and then bend in a downward direction. The first drive frame member 330 and the second drive frame member 332 may then both extend downwards and inwards until the bottom end of the first drive frame member 330 and the bottom end of the second drive frame member 332 are beneath the housing ring 200.

The drive motor 336 may be coupled to the first drive frame member 330 or to the second drive frame member 332 such that a second shaft 338 of the drive motor 336 extends through and couples to the bottom roller 345. The drive motor 336 may cause the bottom roller 345 to rotate when the drive motor 336 is energized.

The top roller 340 may be a horizontally-oriented cylinder that is coupled to a top axle 342. One end of the top axle 342 may be rotatably coupled to the first drive frame member 330 and the opposite end of the top axle 342 may be rotatably couple to the second drive frame member 332. The bottom roller 345 may be a horizontally-oriented cylinder that is coupled to a bottom axle 347. One end of the bottom axle 347 may be rotatably coupled to the first drive frame member 330 and the opposite end of the bottom axle 347 may be rotatably couple to the second drive frame member 332. The bottom axle 347 may be a continuation of the second shaft 338. The top roller 340 may be located at the top of the individual drive unit 318 and the bottom roller 345 may be located at the bottom of the individual drive unit 318.

In some embodiments, the bottom roller 345 may be compressible to adjust for the diameter of the tree trunk 905. If the invention 100 is installed on the tree trunk 905 that is a larger diameter than the clearance between the plurality of drive units 300 allows, the bottom roller 345 on each of the first drive unit 312, the second drive unit 314, and the second drive unit 314 may compress to accommodate the tree trunk 905 and top press against the tree trunk 905.

The drive belt 334 may be a continuous band of flexible material that is stretched over the top roller 340 and the bottom roller 345. The drive belt 334 may move in a continuous path around both the top roller 340 and the bottom roller 345 as the drive motor 336 turns the bottom roller 345. The drive belt 334 may comprise a non-slip coating 349 that increases friction between the individual drive unit 318 and the tree trunk 905.

The trimmer control box 370 may be adapted to allow a user 950 to operate the invention 100 from the ground using a plurality of controls 375. The trimmer control box 370 may be located in line with the power cord 380. One or more of the plurality of controls 375 may energize the drive motors 336 with electricity having the first polarity. The resulting rotation of drive belts 400 may cause the invention 100 to ascend the palm tree 900. One or more of the plurality of controls 375 may energize the drive motors 336 with electricity having the second polarity, causing the invention 100 to descend. One or more of the plurality of controls 375 may deenergize the drive motors 336 to stop vertical motion of the invention 100. One or more of the plurality of controls 375 may energize the cutting motor 210 with electricity, causing rotation of the cutting ring 410. The rotation of the cutting ring 410 may cause the plurality of blades 260 to cut the trimmings 910 from the palm tree 900. One or more of the plurality of controls 375 may deenergize the cutting motor 210 to stop the rotation of the cutting ring 410.

In use, the invention 100 may be assembled by aligning the first cutting ring half 252 with the second cutting ring half 254 on opposites side of the tree trunk 905 with the tabs 262 and the slots 264 at the first cutting ring joint 256 and the second cutting ring joint 258 interlocked. The first housing ring half 202 and the second housing ring half 204 may be placed over top of the first cutting ring half 252 and the second cutting ring half 254 such that the cutting ring 250 sits within the blade track 220 of the housing ring 200. The housing ring 200 may be completed by passing the plurality of screws 205 through the screw apertures 206 on the flanges 207 of the first housing ring half 202 and the second housing ring half 204.

With the power cord 380 plugged into a source of electricity, the invention 100 may be used by first activating the plurality of controls 375 to energize the cutting motor 210, causing the rotation of the cutting ring 410. The plurality of controls 375 may then be used to energize the drive motors 336 with electricity having the first polarity to make the invention 100 ascend the tree trunk 905. The plurality of blades 260 may trim the palm tree 900 and the trimmings 910 may fall to the ground.

The plurality of controls 375 may be used to deenergize the cutting motor 210 to stop the rotation of the cutting ring 410. The plurality of controls 375 may be used to energize the drive motors 336 with electricity having the second polarity to cause the invention 100 to descend. Once the invention 100 is at ground level, the power cord 380 may be unplugged and the housing ring 200 and the cutting ring 250 may be removed from the palm tree 900 by reversing the assembly steps that were stated earlier.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, an "axle" is a cylindrical shaft that is inserted through the center of an object such that the center axis of the object and the center axis of the axle are aligned and the object can rotate using the axle as an axis of rotation.

In this disclosure, "compress" refers to forcing into a smaller space.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "cylinder" is a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "energize" and/or "energization" refer to the application of an electrical potential to a system or subsystem.

As used in this disclosure, "flexible" refers to an object or material which will deform when a force is applied to it, which will not return to its original shape when the deforming force is removed, and which may not retain the deformed shape caused by the deforming force.

As used in this disclosure, a "gear" is a toothed wheel, cylinder, or other toothed mechanical element that is used to transmit motion, a change of speed, or a change of direction to second toothed wheel, cylinder, rack, or other toothed or slotted mechanical element.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "housing" is a rigid casing that encloses and protects one or more devices.

As used in this disclosure, a "motor" refers to a device that transforms energy from an external power source into mechanical energy.

As used in this disclosure, "orientation" refers to the positioning and/or angular alignment of a first object relative to a second object or relative to a reference position or reference direction.

As used in this disclosure, the term "shaft" is used to describe a rigid cylinder that is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "slot" is a long narrow groove, cut, opening, or aperture that is formed in or through an object.

As used in this disclosure, a "tab" is an extension of an object for the purpose of facilitating the manipulation of the object, identifying the object, or attaching the object to another object.

As used in this disclosure, a "track" is a device that is used to control the path of motion of an object in at least one dimension.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A climbing palm tree trimmer comprising:
a housing ring, a cutting ring, a plurality of drive units, a trimmer control box, and a power cord;
wherein the climbing palm tree trimmer ascends and descends a tree trunk of a palm tree in order to trim the top of the palm tree;
wherein a plurality of blades project upwards from the cutting ring;
wherein the plurality of blades and the cutting ring rotate with respect to the housing in order to be configured to cut trimmings from the palm tree;
wherein the cutting ring separates such that the cutting ring is placed around the tree trunk and reassembled;
wherein the housing ring likewise separates such that the housing ring is placed around the tree trunk and reassembled;
wherein the plurality of drive units move the climbing palm tree trimmer up or down the tree trunk;
wherein up and down movements and activation of the cutting ring are controlled from the ground using the trimmer control box;
wherein the housing ring comprises a first housing ring half, a second housing ring half, a cutting motor, a blade track, a first housing ring joint, and a second housing ring joint;
wherein the housing ring is an annular frame of the climbing palm tree trimmer;
wherein the housing ring surrounds the tree trunk of the palm tree in a horizontal orientation;
wherein the plurality of drive units are coupled to an outer wall of the housing ring equally spaced around the outer wall;
wherein the cutting ring rotates within the housing ring;
wherein the cutting motor is coupled to the housing ring such that a pinion gear on the cutting motor meshes with a ring gear on the cutting ring via a gear aperture on the housing ring;
wherein the first housing ring half and the second housing ring half each comprise one half of the housing ring;
wherein the plurality of drive units is further defined with a first drive unit, a second drive unit, and a third drive unit;
wherein the first drive unit, the second drive unit, and the cutting motor are contained within the first housing ring half;
wherein the third drive unit is contained within the second housing ring half;
wherein the blade track is a groove around an inner wall of the housing ring;
wherein a track height of the blade track is larger than a cutting ring height of the cutting ring such that the cutting ring fits within the blade track;

wherein the circumference of the blade track is larger than the circumference of the cutting ring such that the cutting ring is free to rotate while confined by the blade track.

2. The climbing palm tree trimmer according to claim 1
wherein the housing ring separates into the first housing ring half and the second housing ring half such that the housing ring is placed around the tree trunk of the palm tree;
wherein the first housing ring half separates from the second housing ring half at the first housing ring joint and the second housing ring joint.

3. The climbing palm tree trimmer according to claim 2
wherein the first housing ring joint and the second housing ring joint each comprise a plurality of screws passing through screw apertures in flanges of the first housing ring joint and the second housing ring joint.

4. The climbing palm tree trimmer according to claim 2
wherein the cutting motor is coupled to the first housing ring half with a first shaft of the cutting motor vertically oriented and the pinion gear mounted to the top end of the first shaft above the cutting motor;
wherein the cutting motor is positioned such that the pinion gear aligns with the gear aperture in the housing ring;
wherein the cutting motor causes rotation of the pinion gear;
wherein the cutting motor is controlled by the trimmer control box;
wherein the pinion gear meshes with the ring gear of the cutting ring such that rotation of the pinion gear when the cutting motor causes the cutting ring to rotate;
wherein the cutting motor rotates in a direction that causes a leading edge of an individual blade selected from the plurality of blades to strike the palm tree before any other portion of the individual blade.

5. The climbing palm tree trimmer according to claim 4
wherein the cutting ring comprises a first cutting ring half, a second cutting ring half, the plurality of blades, and the ring gear;
wherein the cutting ring is an annular armature that carries the plurality of blades;
wherein the circumference of the cutting ring is larger than the circumference of the inner wall of the housing ring such that the housing ring retains the cutting ring within the blade track on the housing ring.

6. The climbing palm tree trimmer according to claim 5
wherein the cutting ring separates into the first cutting ring half and the second cutting ring half by cleaving at a first cutting ring joint and at a second cutting ring joint;
wherein the first cutting ring joint and the second cutting ring joint are kept in alignment by a tab and a slot located at both the first cutting ring joint and the second cutting ring joint;
wherein separation of the first cutting ring half from the first cutting ring half is prevented by the blade track of the housing ring which squeezes the first cutting ring half and the second cutting ring half together;
wherein the climbing palm tree trimmer is assembled by placing the first cutting ring half and the second cutting ring half on opposites sides of the tree trunk and aligning the tab and the slot at the first cutting ring half and the tab and the slot at the first cutting ring half such that the cutting ring surrounds the tree trunk;
wherein the first housing ring half and the second housing ring half are then placed over the first cutting ring half and the second cutting ring half such that the first cutting ring half and the second cutting ring half slip into the blade track on the first housing ring half and on the second housing ring half;
wherein the plurality of screws are passed through the screw apertures on the flanges at the first housing ring joint and the second housing ring joint to hold the housing ring together.

7. The climbing palm tree trimmer according to claim 6
wherein the plurality of blades project upwards from the top surface of the cutting ring;
wherein the plurality of blades are adjacent to the inside edge of the cutting ring such that the plurality of blades project upwards without interference from the housing ring;
wherein the ring gear comprises a plurality of teeth located along the outside edge of the cutting ring;
wherein the size, shape, and spacing of the teeth are complementary to the size, shape, and spacing of teeth on the pinion gear such that the pinion gear and the ring gear mesh.

8. The climbing palm tree trimmer according to claim 7
wherein the plurality of drive units comprises the first drive unit, the second drive unit, and the third drive unit;
wherein the plurality of drive units contact the tree trunk of the palm tree and hold the housing ring at a vertical height.

9. The climbing palm tree trimmer according to claim 8
wherein an individual drive unit selected from the first drive unit, the second drive unit, and the second drive unit comprises a first drive frame member, a second drive frame member, a drive motor, a top roller, a bottom roller, and a drive belt;
wherein the first drive frame member and the second drive frame member are located on opposite sides of the individual drive unit;
wherein the top of the first drive frame member and the top of the second drive frame member are coupled to the outer wall of the housing ring;
wherein the first drive frame member and the second drive frame member each extend horizontally away from the housing ring and then bend in a downward direction;
wherein the first drive frame member and the second drive frame member then both extend downwards and inwards until the bottom end of the first drive frame member and the bottom end of the second drive frame member are beneath the housing ring.

10. The climbing palm tree trimmer according to claim 9
wherein the drive motor is coupled to the first drive frame member or to the second drive frame member such that a second shaft of the drive motor extends through and couples to the bottom roller;
wherein the drive motor causes the bottom roller to rotate.

11. The climbing palm tree trimmer according to claim 10
wherein the top roller is a horizontally-oriented cylinder that is coupled to a top axle;
wherein one end of the top axle is rotatably coupled to the first drive frame member and the opposite end of the top axle are rotatably couple to the second drive frame member;
wherein the bottom roller is a horizontally-oriented cylinder that is coupled to a bottom axle;
wherein one end of the bottom axle is rotatably coupled to the first drive frame member and the opposite end of the bottom axle are rotatably couple to the second drive frame member;

wherein the bottom axle is a continuation of the second shaft;

wherein the top roller is located at the top of the individual drive unit and the bottom roller is located at the bottom of the individual drive unit.

12. The climbing palm tree trimmer according to claim 11 wherein the bottom roller is compressible to adjust for the diameter of the tree trunk.

13. The climbing palm tree trimmer according to claim 11 wherein the drive belt is a continuous band of flexible material that is stretched over the top roller and the bottom roller;

wherein the drive belt moves in a continuous path around both the top roller and the bottom roller as the drive motor turns the bottom roller.

14. The climbing palm tree trimmer according to claim 13 wherein the trimmer control box is further defined with a plurality of controls;

wherein the plurality of controls is adapted to allow a user to operate the climbing palm tree trimmer from the ground;

wherein the trimmer control box is located in line with the power cord;

wherein the resulting rotation of drive belts causes the climbing palm tree trimmer to ascend the palm tree;

wherein one or more of the plurality of controls control the drive motors, causing the climbing palm tree trimmer to descend;

wherein one or more of the plurality of controls control the drive motors to stop vertical motion of the climbing palm tree trimmer.

15. The climbing palm tree trimmer according to claim 14 wherein one or more of the plurality of controls control the cutting motor, causing rotation of the cutting ring;

wherein the rotation of the cutting ring causes the plurality of blades to cut the trimmings from the palm tree;

wherein one or more of the plurality of controls control the cutting motor to stop the rotation of the cutting ring.

* * * * *